(12) United States Patent
Dunn et al.

(10) Patent No.: US 7,117,690 B1
(45) Date of Patent: Oct. 10, 2006

(54) CHILLED BEVERAGE CONTAINER

(75) Inventors: Steven B. Dunn, Beverly Hills, CA (US); Mark Hatherill, Manhattan Beach, CA (US); Kevin D. Johnson, Los Angeles, CA (US)

(73) Assignee: Munchkin, Inc., North Hills, CA (US)

( * ) Notice: Subject to any disclaimer, the term of this patent is extended or adjusted under 35 U.S.C. 154(b) by 0 days.

(21) Appl. No.: 11/134,014

(22) Filed: May 20, 2005

(51) Int. Cl.
*F25D 3/08* (2006.01)

(52) U.S. Cl. .................................. 62/457.1; 62/457.3
(58) Field of Classification Search ................ 62/457.1, 62/457.3
See application file for complete search history.

(56) References Cited

U.S. PATENT DOCUMENTS

| | | | |
|---|---|---|---|
| 2,895,636 A | 7/1959 | Martin | |
| 4,163,374 A | 8/1979 | Moore et al. | |
| 4,357,809 A | 11/1982 | Held et al. | |
| 4,570,454 A * | 2/1986 | Campbell | 62/457.3 |
| 4,671,267 A | 6/1987 | Stout | |
| 4,882,914 A | 11/1989 | Haines-Keeley et al. | |
| 5,090,213 A * | 2/1992 | Glassman | 62/457.3 |
| 5,782,868 A | 7/1998 | Moore, Jr. et al. | |
| 5,876,620 A | 3/1999 | Tsai | |
| 5,964,102 A * | 10/1999 | Tsai | 62/457.3 |
| 6,085,543 A * | 7/2000 | Su | 62/457.3 |
| 2001/0023595 A1* | 9/2001 | Kaposi | 62/457.3 |
| 2002/0005044 A1* | 1/2002 | Mahajan | 62/457.3 |

FOREIGN PATENT DOCUMENTS

EP      0461549 A1      12/1991

* cited by examiner

*Primary Examiner*—Cheryl Tyler
*Assistant Examiner*—B. Clayton McCraw
(74) *Attorney, Agent, or Firm*—Knoble Yoshia & Dunleavy, LLC

(57) ABSTRACT

A container such as a drinking cup includes an inner wall defining a space and an outer wall that preferably includes portions that are translucent and preferably transparent. A thermal mass is provided between the inner and outer walls and has a decorative pattern that is visually discernible through the outer wall. The thermal mass preferably includes a gel material that will not freeze at the normal operating temperature of a household freezer. The gel material includes a multiplicity of globules that preferably have a median diameter that is within a preferred sizing range. The decorative pattern is preferably created by the provision of a colorant material that is introduced within the interstitial space defined between the gel globules.

6 Claims, 3 Drawing Sheets

CHILLED BEVERAGE CONTAINER

BACKGROUND OF THE INVENTION

1. Field of the Invention

This invention relates generally to articles for holding and maintaining beverages in a chilled state, and particularly concerns an improved chilled beverage container that is visually appealing, safe and durable.

2. Description of the Related Technology

Consumers often prefer to drink beverages such as juice, water and soft drinks in a chilled condition. Typically, such beverages are stored in a cooled area such as a refrigerator or ice chest in order to maintain the desired temperature for consumption. However, once they are removed from storage such beverages tend to heat up quickly, particularly outdoors on warm days.

Several well-established solutions have been advanced for keeping beverages cool for extended periods of time. For example, external insulating sleeves that are fabricated from a foamed rubber or plastic material are well known for keeping beverages that are stored in cans cool. In addition, a number of containers have been proposed that include a fluid or gel disposed in a chamber within the container that is designed to freeze when placed in a household freezer. When taken out of the freezer and filled with a beverage, such containers will prolong the period of time that the beverage is kept chilled. However, the durability and safety of such containers is questionable because expansion of the volume of the liquid or gel when it freezes and subsequent contraction when it melts places a great deal of mechanical stress on the container. Such thermal cyclic expansion and contraction could ultimately breach the chamber in which the liquid or gel is stored, which would be undesirable.

In addition, conventional containers that include a freezable thermal mass are typically bulky and not very visually appealing.

A need exists for a chilled beverage container that is more visually appealing, safer and more durable than conventional freezable chilled beverage containers.

SUMMARY OF THE INVENTION

It is therefore an object of the invention to provide a chilled beverage container that is more visually appealing, safer and more durable than conventional freezable chilled beverage containers.

In order to achieve the above and other objects of the invention, a container according to a first aspect of the invention includes an inner wall defining a space; an outer wall including at least one translucent portion; and a thermal mass positioned between the outer wall and the inner wall, the thermal mass having a decorative pattern that is visually discernible through the translucent portion.

According to a second aspect of the invention, a container includes an inner wall defining a space; an outer wall; and a thermal mass positioned between the outer wall and the inner wall, the thermal mass including a gel material that will not freeze at normal operating temperatures within a household freezer.

A container according to a third aspect of the invention includes an inner wall defining a space; an outer wall; and a thermal mass positioned between the outer wall and the inner wall, the thermal mass comprising a gel material comprising a multiplicity of gel globules, and wherein the gel globules have a median diameter that is within a range of about 0.1 mm to about 20 mm.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
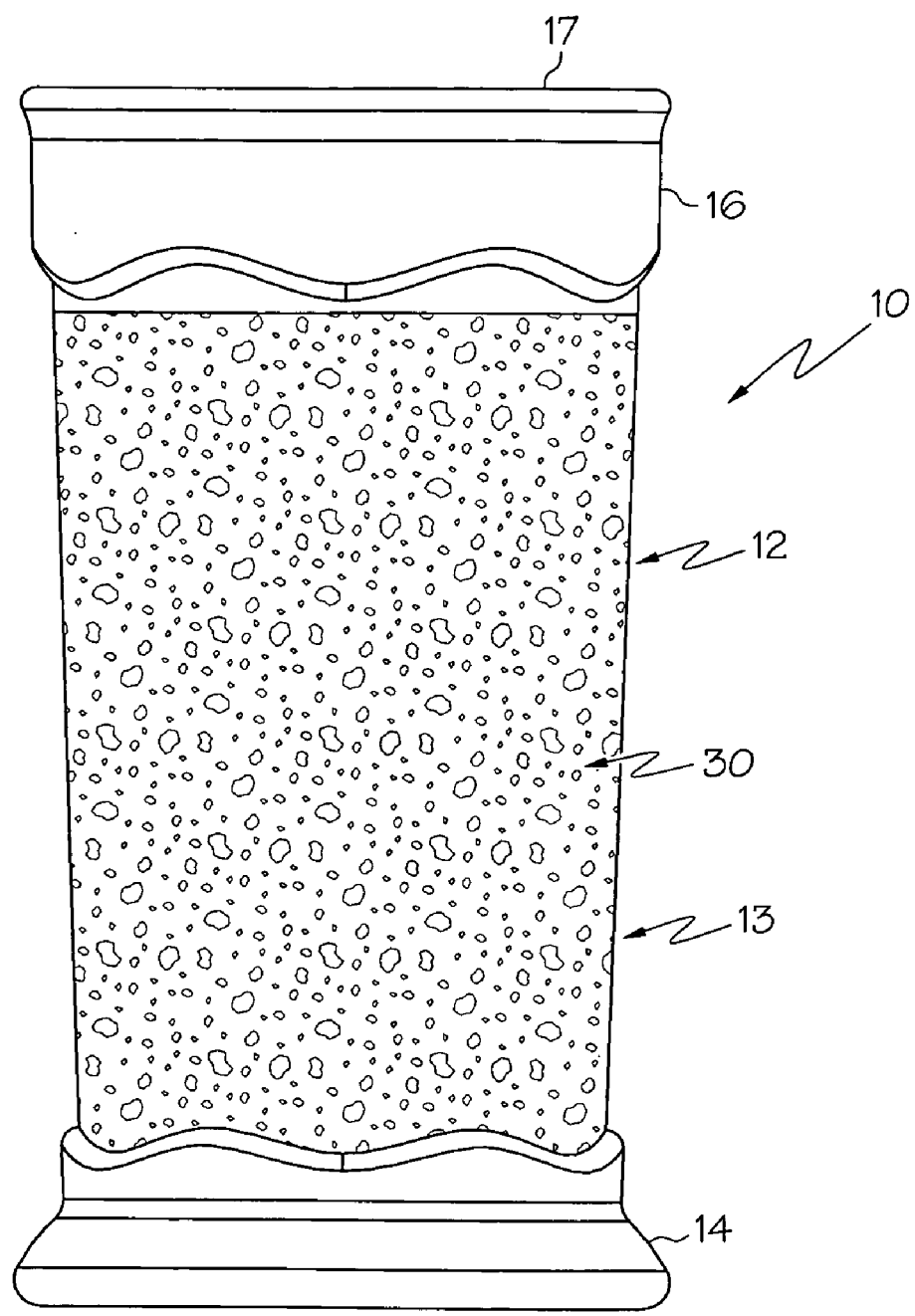
FIG. 1 is a side elevational view of a container that is constructed according to a preferred embodiment of the invention.

Referring now to the drawings, wherein like reference numerals designate corresponding structure throughout the views, and referring in particular to FIG. 1, a container 10 constructed according to a preferred embodiment of the invention is embodied as a drinking cup 12 having a main body portion 13, a resilient elastomeric pedestal or base 14 and a resilient elastomeric upper insert 16 that defines a rim 17.

Figure 2:
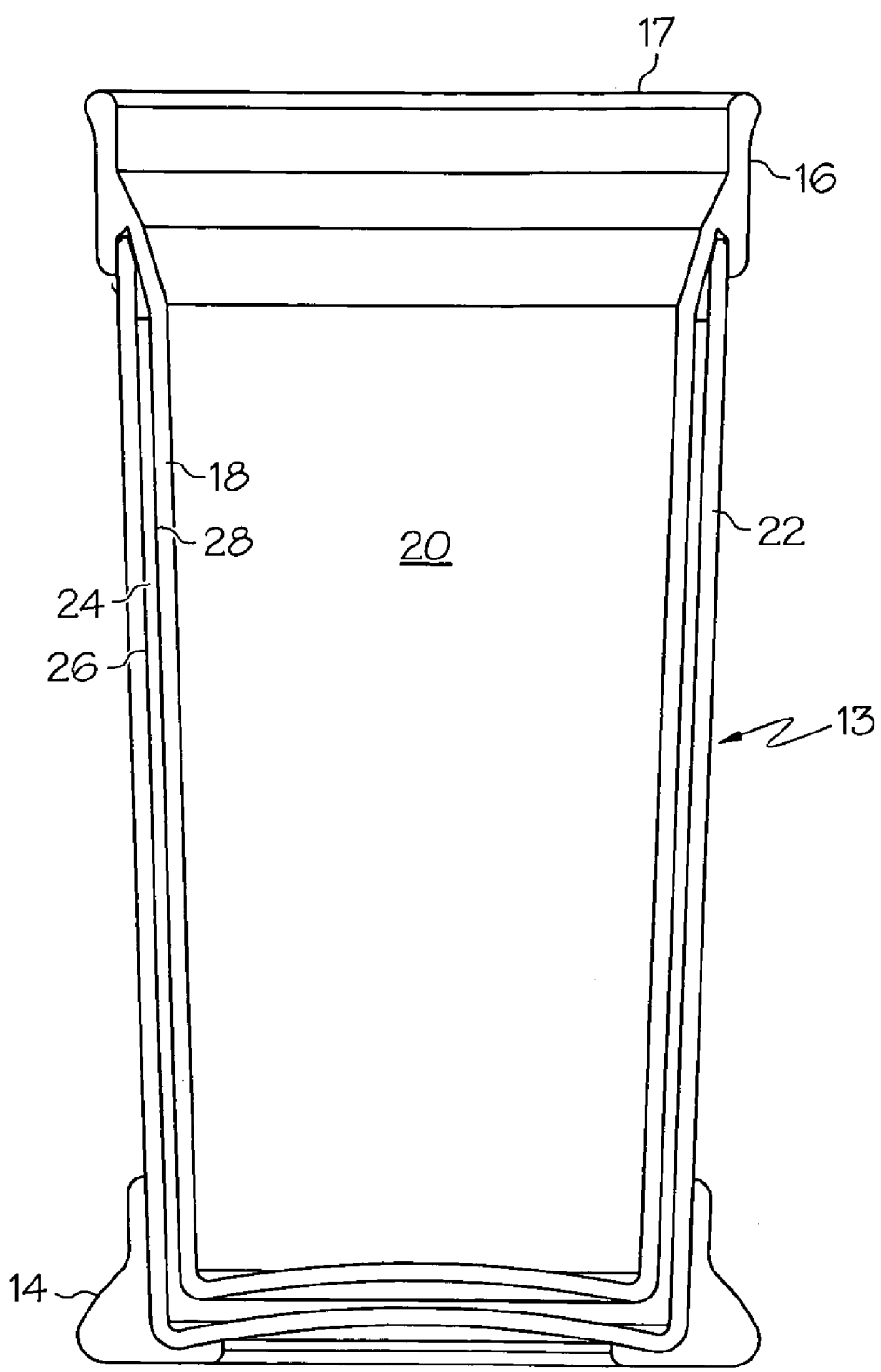
FIG. 2 is a longitudinal cross-sectional view of the container that is depicted in FIG. 1.

As is best shown in FIG. 2, main body portion 13 includes an inner wall 18 having an inner surface that defines an interior space 20 for holding a beverage or other substance. Main body portion 13 further includes an outer wall 22 that is fabricated from a translucent material. Preferably, the entire outer wall 22 is fabricated from a clear, transparent material such as polypropylene, high-density polyethylene, polyethylene terephthalate or polycarbonate plastics. The preferred material is polypropylene. As FIG. 2 shows, an annular compartment 24 is defined between an inner surface 26 of the outer wall 22 and an outer surface 28 of the inner wall 18. Annular compartment 24 is preferably filled with a thermal mass 30 having a relatively high specific heat that may be heated or chilled in order to transfer heat to or away from the contents of drinking cup 12.

Preferably, the thermal mass 30 is a refrigerant material, which for purposes of this document means a material that is designed to be chilled so as to transfer heat away from the contents of the drinking cup 12 in order to keep the contents chilled for as long as possible. Alternatively, thermal mass 30 could be a material that is designed to be heated so as to keep the contents of the drinking cup 12 warm, or a mass that performs both functions.

Figure 3:
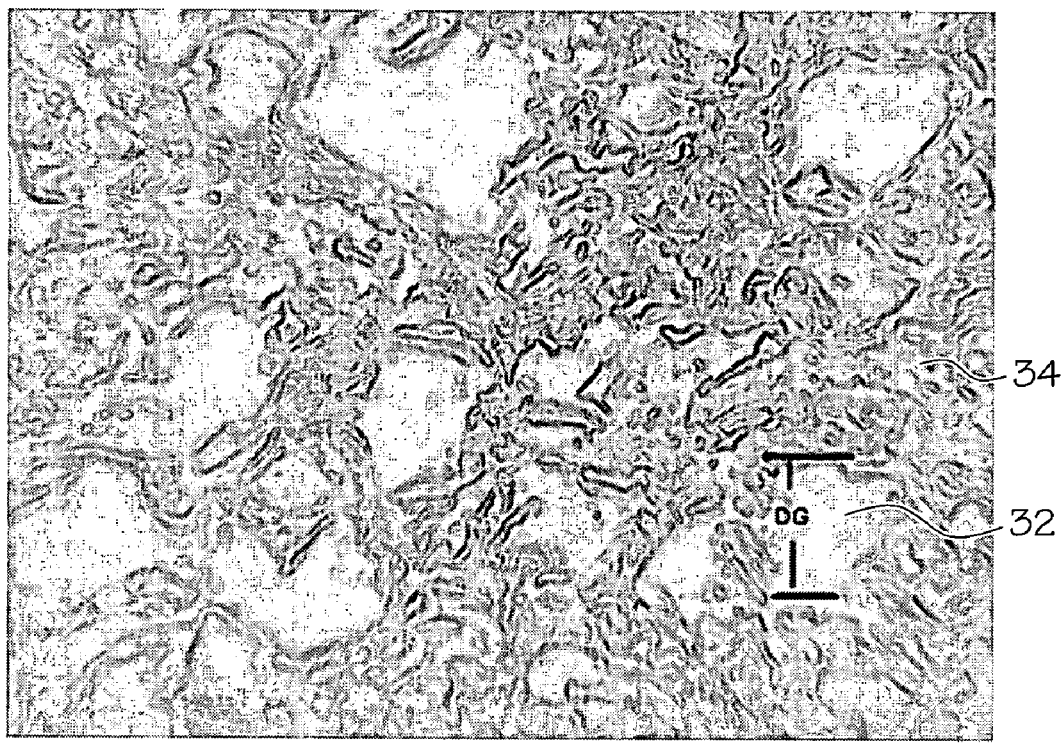
FIG. 3 is a photographic depiction of a thermal mass material according to a preferred embodiment of the invention.

According to one important aspect of the invention, the thermal mass 30 provides a decorative pattern that is visually discernible to consumers through the translucent outer wall 22. The decorative pattern preferably includes a first material and a second material that is visually discernible from the first material. Preferably, the first material is embodied as a gel material that is made up of a multiplicity of small globules 32, as is shown in the photograph provided in FIG. 3. The second material is disposed in an interstitial space 34 that is defined between the globules 32, as FIG. 3 also shows. The second material in the preferred embodiment is preferably a liquid that has a colorant suspended therein. In the preferred embodiment, the small globules 32 of gel are preferably clear, non-colored and transparent. As FIG. 3 shows, the juxtaposition of the clear gel globules 32 and the colored liquid in the interstitial space 34 creates an interesting and aesthetically pleasing variegated pattern that consumers are expected to enjoy.

In the preferred embodiment, the outer surface 28 of the inner wall 18 is preferably opaque so as to provide a high-contrast visual backdrop for the clear gel globules 32 and the colored liquid in the interstitial space. Preferably, inner wall 18 has a light color, which most preferably is white.

Preferably, the globules 32 of gel are configured so as to have a wet grain size with a median diameter $D_G$ that is within a range of about 0.1 mm to about 20 mm, and that is more preferably within a range of about 0.25 mm to about 10 mm.

Gel 20 is preferably formulated from a hydrophilic material in which water is trapped within a polymeric matrix. The hydrophilic material may be selected from the group consisting of glycerin, propylenglycol, ethylene glycol, dimethyl sulfoxide, and dimethyl formimide, with the preferred material being propylenglycol. The preferred polymeric matrix is selected from the group consisting of polymers, copolymers, and terpolymers containing acrylic acid or acrylamide monomer moieties, and most preferably is a polymer of acrylaide. A variety of formulations can be employed in the formulation of gel 20; several are specifically disclosed in U.S. Pat. No. 4,671,267, issued to Edward I. Stout, which is hereby incorporated by reference as if set forth fully herein.

In a first embodiment of the invention, the thermal mass is fabricated so that it is designed to freeze in temperatures that would normally be expected to exist within a household freezer, and so that it will avoid boiling at temperatures beneath about 180° F., which will prevent it from boiling in most residential dishwashers. More preferably, the thermal mass is fabricated to avoid boiling at temperatures beneath about 200° F. Household freezers are generally maintained at temperatures of between about 0° F. to about 5° F. In this embodiment, the freezing temperature of the thermal mass is preferably within a range of about 5° F. to about 32° F., and is preferably about 10° F. A composition that would provide the desired characteristics of this embodiment of the invention includes 96.86% by weight distilled water, 0.77% ammonia polyacrylate, 2.31% propylenglycol with 0.07% Kathon GC added as a preservative. Colorants such as food dyes may be added in percentages that are preferably 1% by weight or less in order to achieve the desired variegated aesthetic effect. This composition will freeze at a temperature of about 25° F. after about four hours and avoids boiling at temperatures up to about 215° F.

In alternative composition according to the first embodiment of the invention would include 83.15% distilled water, 0.77% ammonia polyacrylate, 16.01% propylenglycol with 0.07% Kathon GC added as a preservative. Again, colorants such as food dyes may be added in percentages that are preferably 1% by weight or less in order to achieve the desired variegated aesthetic effect. This composition will freeze at a temperature of about 20° F. after about four hours and avoids boiling at temperatures up to about 215° F.

In a second embodiment of the invention, the thermal mass is fabricated so that it is not expected to freeze at temperatures that would normally be expected to exist within a household freezer. This embodiment of the invention provides the advantage that the slight expansion and contraction that is associated with freezing and melting will be avoided, thus reducing thermal cyclic stresses on the container 10, and particularly on the structure that defines and maintains the integrity of the annular compartment 24. Preferably, a thermal mass according to this embodiment will have freezing temperature that is no greater than 0° F., and will be able to withstand temperatures of 180° F. or greater without boiling. A composition that would provide the desired characteristics of this embodiment of the invention includes 80.89% by weight distilled water, 4.76% ammonia polyacrylate, 14.28% propylenglycol with 0.07% Kathon GC added as a preservative. Colorants such as food dyes may be added in percentages that are preferably 1% by weight or less in order to achieve the desired variegated aesthetic effect. This composition has a freezing point of approximately −20° F. and avoids boiling at temperatures up to 215° F.

A second example of a composition according to the second embodiment of the invention would include 67.16% by weight distilled water, 0.77% ammonia polyacrylate, 32% propylenglycol with 0.07% Kathon GC added as a preservative. Colorants such as food dyes may be added in percentages that are preferably 1% by weight or less in order to achieve the desired variegated aesthetic effect. This composition has a freezing point of approximately 0° F. and avoids boiling at temperatures up to 215° F.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A container, comprising:
an inner wall defining a space;
an outer wall; and
a thermal mass positioned between said outer wall and said inner wall, said thermal mass comprising a gel material that will not freeze at normal operating temperatures within a household freezer.

2. A container according to claim 1, wherein said gel material is a material that will freeze at a temperature of 0° F. or below.

3. A container according to claim 1, wherein said gel material is a material that will not freeze at temperatures of −10° F. and above.

4. A container according to claim 1, wherein said container is a drinking cup.

5. A container according to claim 1, wherein said gel material comprises a multiplicity of gel globules that have a median diameter that is within a range of about 0.1 mm to about 20 mm.

6. A container according to claim 5, wherein said multiplicity of gel globules have a median diameter that is within a range of about 0.25 mm to about 10 mm.

* * * * *